(12) United States Patent
Barbir

(10) Patent No.: US 6,404,888 B1
(45) Date of Patent: Jun. 11, 2002

(54) CONFUSION DATA GENERATOR

(75) Inventor: Abdulkader Omar Barbir, Nepean (CA)

(73) Assignee: Zarlink Semiconductor Inc., Kanata (CA)

( * ) Notice: Subject to any disclaimer, the term of this patent is extended or adjusted under 35 U.S.C. 154(b) by 0 days.

(21) Appl. No.: 09/113,494

(22) Filed: Jul. 10, 1998

(30) Foreign Application Priority Data

Jul. 11, 1997 (CA) ............................................. 2210199

(51) Int. Cl.⁷ ................................................. H04K 1/02
(52) U.S. Cl. .......................................... 380/22; 380/42
(58) Field of Search ............................. 380/22, 42, 43, 380/28, 264, 45, 46, 268

(56) References Cited

U.S. PATENT DOCUMENTS

| 4,316,055 A | | 2/1982 | Fiestel |
| 4,471,164 A | | 9/1984 | Henry |
| 4,776,011 A | | 10/1988 | Busby |
| 4,815,130 A | | 3/1989 | Lee et al. |
| 4,979,832 A | | 12/1990 | Ritter |
| 5,245,339 A | * | 9/1993 | Cideciyan ..................... 341/95 |
| 5,276,738 A | | 1/1994 | Hirsch |
| 5,345,507 A | | 9/1994 | Herzberg et al. |
| 5,351,300 A | | 9/1994 | Quisquater et al. |
| 5,365,588 A | | 11/1994 | Bianco et al. |
| 5,390,321 A | * | 2/1995 | Proesel ......................... 710/62 |
| 5,428,686 A | | 6/1995 | Brown |
| 5,440,640 A | * | 8/1995 | Anshel et al. ................. 380/46 |
| 5,619,576 A | | 4/1997 | Shaw |
| 5,703,952 A | * | 12/1997 | Taylor .......................... 380/44 |
| 5,727,062 A | | 3/1998 | Ritter |
| 5,774,738 A | * | 6/1998 | Hillan ............................ 712/1 |
| 5,835,597 A | | 11/1998 | Coppersmith et al. |
| 5,878,424 A | * | 3/1999 | Dooling et al. ............. 707/102 |
| 5,983,252 A | * | 11/1999 | Clapp .......................... 708/250 |
| 5,999,895 A | * | 12/1999 | Forest ............................ 704/1 |
| 6,014,445 A | | 1/2000 | Kohda et al. |
| 6,122,379 A | * | 9/2000 | Barbir ......................... 380/269 |

FOREIGN PATENT DOCUMENTS

| EP | 0725511 A2 | 2/1995 |
| EP | 0658022 A2 | 6/1995 |
| EP | 0667691 A2 | 8/1995 |
| JP | 9-116533 | 2/1997 |
| WO | 98/05142 | 2/1998 |

* cited by examiner

Primary Examiner—Thomas R. Peeso
(74) Attorney, Agent, or Firm—Miles & Stockbridge P.C.; Edward J. Kondracki

(57) ABSTRACT

A confusion data generator for the generation of non-linear confusion data utilizes a plurality of arrays acting as non-linear state machines to generate a stream of confusion data of a certain width. Each non-linear state machine contributes equally to the overall width of the confusion data. The output bit stream from the confusion data generator is then used with a combiner such as an XOR combiner to generate secure text from plaintext. The confusion data generator can be used to securely store data on a storage medium or transmit data over a communication medium. The confusion data generator is computationally inexpensive, scalable and provides good security when used with a combiner, such as an XOR combiner, to generate secure text.

15 Claims, 6 Drawing Sheets

CONFUSION DATA GENERATOR

FIELD OF INVENTION

The present invention relates to a method and apparatus for the generation of confusion data. More particularly, the invention relates to a confusion data generator for generating non-linear confusion data for use with a combiner to store plaintext data on a storage medium or to transmit data over a communication medium in a secure fashion.

BACKGROUND OF THE INVENTION

In this application, the phrases "application of data to a medium" or "applying data to a medium" refer to the act of putting the data on a communication medium or mediums, or a storage medium or mediums. This involves the act of generating physical signals (i.e. electrical, electromagnetic, light, or other) which are sent (for a communication medium) or stored (for a storage medium).

Whether data is transmitted or stored, it is susceptible to unauthorized observation. Security is becoming particularly difficult as computers are increasingly networked, thus increasing potential access to stored or transmitted confidential data. Therefore, to transmit or store data in a secure fashion, the data must be encrypted.

One of the main objectives of the field of data encryption is to transform plaintext data into ciphertext data in a way to conceal the information content of the original data. For the transformation to be of any value, it should be reversible, meaning that an inverse transformation should exist that enables the user to obtain the original plaintext from the ciphertext (i.e. decryption). In general, the process involves the use of a secret key in the encryption and decryption phases.

There are many encryption techniques that can be used to transfer plaintext into ciphertext. Such techniques generally utilize block ciphers, substitution ciphers, stream ciphers or random number generators. However, due to the ease of their implementation in software and hardware, stream ciphers have gained popularity as fast encryptor devices. Hence, many popular encryption techniques are based on stream ciphers.

In general, a stream cipher combines plaintext data with pseudo-random confusion data to produce ciphertext data. Hence, a stream cipher can be thought of as a confusion data generator and a combiner. An important combiner is based on the binary bit-by-bit addition mod 2, which is also known as the Boolean logic exclusive-OR (XOR) function. Hence, the confusion data would be combined with the plaintext data by using the XOR function in order to encrypt the plaintext. In the decryption process, the same confusion data would be XORed with the ciphertext data in order to recover the original plaintext.

The design of ciphers must assume that the cipher must be able to confront an unauthorized attacker who seeks the information contained in the ciphertext. In this regard, the use of the XOR function is useful in the encryption process. This is because the task of XORing the plaintext with pseudo-random bytes generally results in the generation of pseudo-random bytes. This helps to disguise the frequency statistics of the plaintext data. Furthermore, the use of the XOR function has the advantage of making the decrypting process simple. This is because it is possible to extract the plaintext from the ciphertext by simply XORing the ciphertext with the confusion data.

The use of the XOR function as a combiner has a major drawback: the use of the XOR function allows an unauthorized analyst to cryptoanalyze the confusion stream. This can be done by using plaintext attacks. If an analyst is able to obtain some amount of plaintext and the matching ciphertext, the analyst can recover that portion of the confusion data. In the worst case scenario, the unauthorized attacker could analyse the confusion data and manage to reproduce the pseudo-random source, thus making the decryption of all subsequent messages possible. Therefore, designers must develop confusion generators or random number generators which are exceedingly difficult for a cryptanalyst to analyse successfully.

SUMMARY OF THE INVENTION

Accordingly, an important object of the present invention is to provide a confusion data generator for generating confusion data which is difficult to cryptoanalyze when used with a combiner, such as an XOR combiner.

A second object of the invention is to provide a confusion data generator that is scalable and capable of being implemented in hardware and software of various complexities.

A third object of the invention is to provide a confusion data generator that is fast and therefore computationally inexpensive.

The confusion data generator of the present invention generates non-linear confusion data. In one embodiment, the confusion data generator uses a plurality of arrays, i.e. at least two arrays, acting as non-linear state machines to generate a stream of confusion data made up of blocks of confusion bits. Each non-linear state machine produces sub-blocks of confusion bits and thereby contributes equally to the overall width of the confusion data. The state machines drive each other in a feed forward and feed back fashion. The output bit stream from the confusion data generator is then used with a combiner such as an XOR combiner to generate secure text from plaintext. The confusion data generator can be used to securely store data on a storage medium or transmit data over a communication medium. The confusion data generator is computationally inexpensive, scalable and provides good security when used with a combiner, such as an XOR combiner, to generate secure text.

According to the invention, there is provided a confusion data generator comprising first and second state machines, the second state machine driving the first state machine using data feedback.

According to the invention, there is further provided a confusion data generator comprising: a series of state machines including first and last state machines, each state machine driving the next state machine in the series in a forward fashion, and the last state machine driving the first state machine using data feedback.

According to the invention, there is further provided a non-linear confusion data generator for generating blocks of confusion bits, the confusion data generator comprising: (a) a location counter having a value corresponding to the number of blocks of confusion bits generated; (b) a first array comprising a series of data elements, each of which has a value; (c) a first index having a value corresponding to a data element in the first array; (d) a second index having a value corresponding to a data element in the first array; (e) a second array comprising a series of data elements, each of which has a value; (f) a third index having a value corresponding to a data element in the second array; (g) a fourth index having a value corresponding to a data element in the second array; (h) means for incrementing the value of the location counter; (i) means for updating the value of the first index as a function of the value of the first index, the value of the data element of the first array corresponding to the value of the location counter, and the value of the data element of the second array corresponding to the value of the location counter; (j) means for updating the value of the second index as a function of the value of the data element in the first array corresponding to the value of the first index, and the value of the data element in the first array corresponding to the value of the location counter; (k) means for exchanging the value of the data element in the first array corresponding to the value of the first index and the value of the data element in the first array corresponding to the value of the location counter; (l) means for updating the value of the third index as a function of the value of the third index, the value of the data element of the first array corresponding to value of the location counter, and the value of the data element of the second array corresponding to the value of the location counter; (m) means for updating the value of the fourth index as a function of the value of the data element in the second array corresponding to the value of the third index, and the value of the data element in the second array corresponding to the value of the location counter; (n) means for exchanging the value of the data element in the second array corresponding to the value of the third index and the value of the data element in the second array corresponding to the value of the location counter; (o) means for generating from the first array a first sub-block of confusion bits equal to the value of the data element in the first array corresponding to the value of the second index; (p) means for generating from the second array a second sub-block of confusion bits equal to the value of the data element in the second array corresponding to the value of the fourth index; (q) means for generate corresponding to the first and second sub-blocks of confusion bits; and (r) means for applying the block of confusion bits to a medium.

According to the invention, there is further provided a non-linear confusion data generator for generating blocks of confusion bits, the confusion data generator comprising: (a) a location counter having a value corresponding to the number of blocks of confusion bits generated; (b) a plurality of arrays, each array comprising: (i) a series of data elements, each data element having a value; (ii) a first index having a value corresponding to a data element in the array; and (iii) a second index having a value corresponding to a data element in the array; (c) means for incrementing the value of the location counter; (d) means for updating the value of the first index in each array as a function of the value of the first index of such array, the value of the data element of such array corresponding to the value of the location counter, and the value of the data element of at least one other array corresponding to the value of the location counter; (e) means for updating the value of the second index in each array as a function of the value of the data element in such array corresponding to the value of the first index in such array, and the value of the data element in such array corresponding to the value of the location counter; (f) means for exchanging the value of the data element in each array corresponding to the value of the first index in such array and the value of the data element in such array corresponding to the value of the location counter; (g) means for generating from the each array a sub-block of confusion bits equal to the value of the data element in such array corresponding to the value of the second index in such array; (h) means for generating a block of confusion bits comprising the sub-blocks of confusion bits generated by the arrays; and (i) means for applying the block of confusion bits to a medium.

According to the invention, there is further provided a method for generating blocks of confusion bits, the method utilizing a non-linear confusion data generator comprising: a location counter having a value corresponding to the number of blocks of confusion bits generated; a first array comprising a series of data elements, each of which has a value; a first index having a value corresponding to a data element in the first array; a second index having a value corresponding to a data element in the first array; a second array comprising a series of data elements, each of which has a value; a third index having a value corresponding to a data element in the second array; and a fourth index having a value corresponding to a data element in the second array; the method comprising: (a) incrementing the value of the location counter; (b) updating the value of the first index as a function of the value of the first index, the value of the data element of the first array corresponding to the value of the location counter, and the value of the data element of the second array corresponding to the value of the location counter; (c) updating the value of the second index as a function of the value of the data element in the first array corresponding to the value of the first index, and the value of the data element in the first array corresponding to the value of the location counter; (d) exchanging the value of the data element in the first array corresponding to the value of the first index and the value of the data element in the first array corresponding to the value of the location counter; (e) updating the value of the third index as a function of the value of the third index, the value of the data element of the first array corresponding to value of the location counter, and the value of the data element of the second array corresponding to the value of the location counter; (f) updating the value of the fourth index as a function of the value of the data element in the second array corresponding to the value of the third index, and the value of the data element in the second array corresponding to the value of the location counter; (g) exchanging the value of the data element in the second array corresponding to the value of the third index and the value of the data element in the second array corresponding to the value of the location counter; (h) the first array generating a first sub-block of confusion bits equal to the value of the data element in the first array corresponding to the value of the second index; (i) the second array generating a second sub-block of confusion bits equal to the value of the data element in the second array corresponding to the value of the fourth index; (j) generating a block of confusion bits comprising the first and second sub-blocks of confusion bits; and (k) applying the block of confusion bits to a medium.

According to the invention, there is further provided a method for generating blocks of confusion bits, the method utilizing a non-linear confusion data generator comprising: a location counter having a value corresponding to the number of blocks of confusion bits generated; a plurality of arrays, each array comprising a series of data elements, each data element having a value a first index having a value corresponding to a data element in the array and a second index having a value corresponding to a data element in the array; (a) incrementing the value of the location counter; (b) updating the value of the first index in each array as a function of the value of the first index of such array, the value of the data element of such array corresponding to the value of the location counter, and the value of the data element of at least one other array corresponding to the value of the location counter; (c) updating the value of the second index in each array as a function of the value of the data element in such array corresponding to the value of the first index in such array, and the value of the data element in such array corresponding to the value of the location counter; (d) exchanging the value of the data element in each array corresponding to the value of the first index in such array and the value of the data element in such array corresponding to the value of the location counter; (e) generating from the each array a sub-block of confusion bits equal to the value of the data element in such array corresponding to the value of the second index in such array; (f) generating a block of confusion bits comprising the sub-blocks of confusion bits generated by the arrays; and (g) applying the block of confusion bits to a medium.

Among the advantages of the present invention are that the confusion data generator of the present invention: generates highly non-linear or complex confusion data that is difficult to cryptoanalyze (whether used with an XOR combiner or another combiner); is scalable and capable of being implemented in hardware and software of various complexities; and is fast and therefore computationally inexpensive.

Other advantages, objects and features of the present invention will be readily apparent to those skilled in the art from a review of the following detailed description of preferred embodiments in conjunction with the accompanying drawings and claims.

BRIEF DESCRIPTION OF THE DRAWINGS

The embodiments of the invention will now be described with reference to the accompanying drawings, in which.

Similar references are used in different figures to denote similar components.

DETAILED DESCRIPTION OF THE INVENTION

The present invention presents a method and apparatus for developing highly non-linear or complex confusion data generators (CDG) that can be used to securely store data on a storage medium or transmit data over a communication medium. The invention allows the development of scalable confusion data generators that generate a stream of confusion data of user defined width (such as 4 bit, 6 bit, 12 bit, etc.), thus resulting in the ability to efficiently implement the confusion data generator in hardware and software to minimize development costs.

The following is a description of preferred embodiments of the invention. The embodiments employ a system that performs data encryption and data decryption based on an encryption key or a seed. The system introduces randomness into the data such that it can only be decrypted by a system that uses the same confusion data generator and the same key.

Figure 1:
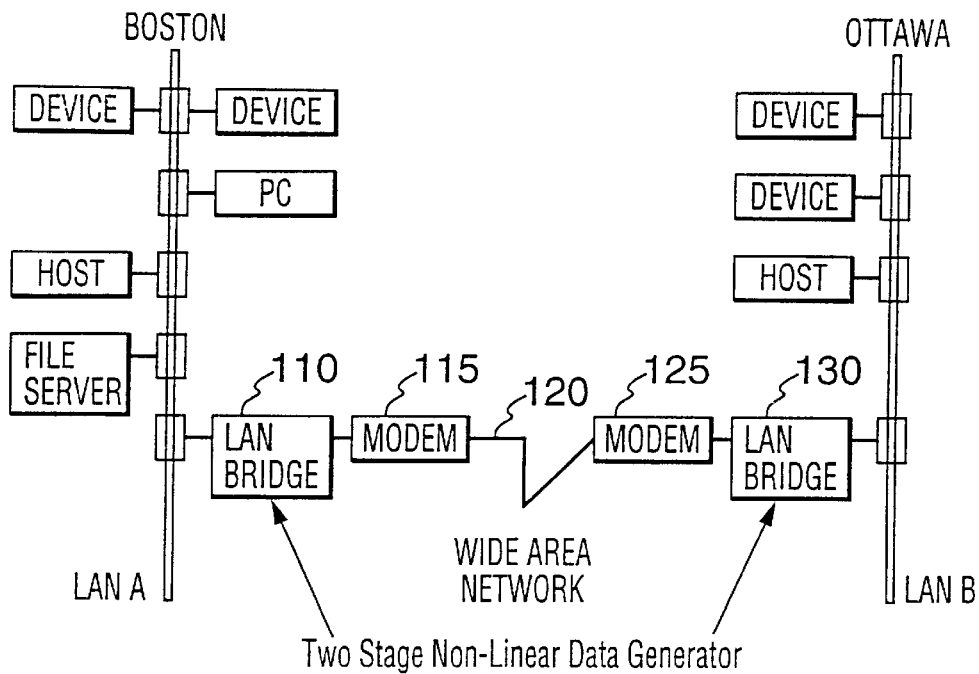
FIG. 1 is a block diagram of a Local Area Network (LAN) to LAN communication network over a Wide Area Network (WAN) link.

Referring to FIG. 1, a pair of Local Area Networks (LANs), namely LAN A and LAN B, are shown. LAN A is located in Boston, and LAN B is located in Ottawa. Each LAN has attached thereto various devices which are well known in the art. In general, for security purposes, there may be a need for data encryption within each of LAN A and LAN B. However, there is a greater need to encrypt the data during its transport from LAN A to LAN B over the unprotected public network. Hence, when data is transmitted from LAN A to LAN B, it will pass through LANBRIDGE 110 processor, where the user portion of the data packets appearing on LAN A is encrypted in accordance with the teachings of the present invention. The data is then transmitted by modem 115 over Wide Area Network (WAN) link 120 to modem 125. The received user data packets are then decrypted by LANBRIDGE 130 and the packets appearing at the input to LANBRIDGE 130 are reconstructed and placed on LAN B.

Figure 2:
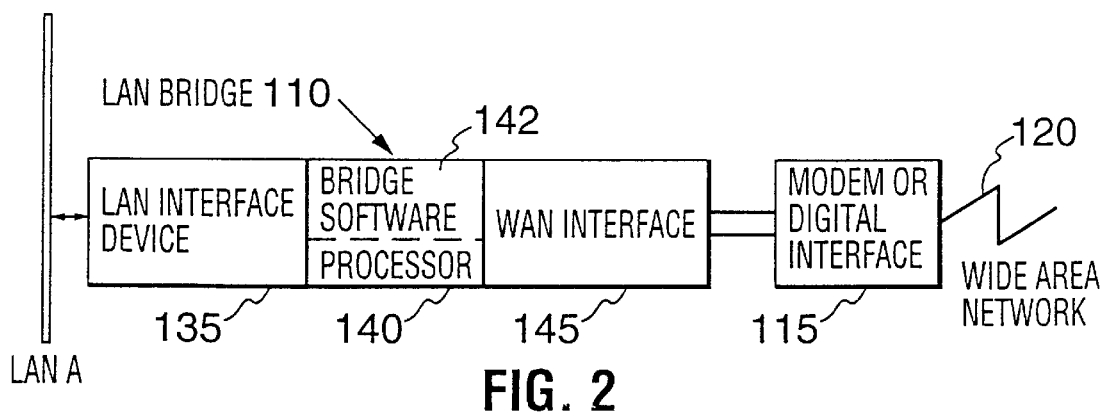
FIG. 2 is a block diagram of the main processor of FIG. 2.

In FIG. 2, a block diagram of LANBRIDGE 110 is shown. Data packets appearing on LAN A are received by LAN interface device 135 and passed into LANBRIDGE 110 processor 140. Within the processor 140 is bridge software 142 which, in addition to performing routing and other functions, also performs data encryption and decryption on the data portion of the packets.

Figure 3:
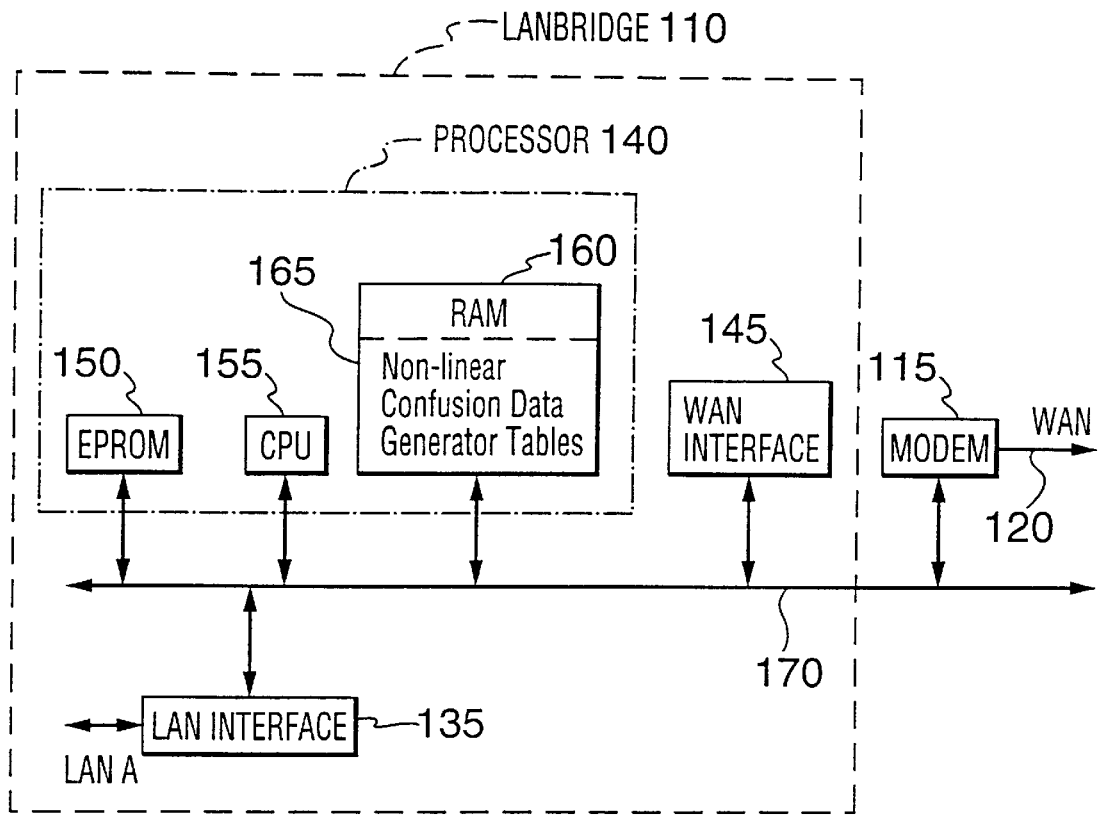
FIG. 3 is a block diagram showing major hardware components of the processor of FIG. 3.

A high level block diagram of LANBRIDGE 110 processor is shown in FIG. 3. A central processing unit (CPU) 155 forms the heart of LANBRIDGE 110. The CPU 155 communicates with other elements of the system via bus 170. The LAN interface 135 is connected to its bus 170, as is WAN interface 145 which provides a gateway for data to and from modem 115. An electrically alterable programmable read only memory (EPROM) 150 and random access memory (RAM) 160 provide storage functions for CPU 155. Within RAM 160 are tables 165 that are employed by the encryption software 142. In FIG. 3, the processor 140 includes EPROM 150, CPU 155 and RAM 160. Alternatively, the CPU may be any special hardware device.

Before introducing the confusion data generator (CDG) as developed in this invention, it is beneficial to introduce some basic notations. In particular, we make reference of the use of the mathematical modulo operation (mod), which gives the remainder of dividing one number by the other. The term exchange means that the contents of two data variables is interchanged. The term array is used in the context of the C programming language which indicates a set of elements having the same data type that could be referenced by indexing them. Hence, an array R is a one dimensional entity of certain size or dimension, such as 'b', with elements assuming locations zero to 'b−1'. In this invention an array is viewed as a state machine that could transform from one state to another. The order of elements in an array defines the state of the array at a given time. Hence, if two elements of an array are exchanged, then the state of the array is changed, since the new order of elements in the array is different from the old order of elements in the array.

The confusion data generator of the invention uses at least two arrays acting as non-linear state machines to generate the confusion data. Herein, such arrays are termed cipher arrays. The next state of a cipher array is determined as a function of its present state and the states of one or more other cipher arrays. The transition process is determined in a non-linear fashion based on the mathematical concept of randomization by non-linear exchange. The initialization of the cipher arrays is performed as a function of all the cipher arrays and a secret key array. The secret key array holds the user seed.

The design of the confusion data generator of the present invention requires that the total width 'm' in bits of the confusion data and the number of cipher arrays 'n' be specified by the designer. This in turn determines the width 'w' of random bits and the dimension of each of the cipher arrays that are used in the design. For the following analysis, and without limiting the generality of the foregoing, it is assumed that the dimension of each cipher arrays is an integral power of two and that the width 'm' of the confusion data is a multiple of two.

Before the confusion data of this invention is used, a three step initialization process is performed. The first step of the initialization process consists of setting up the secret key array. In this step, the user seed is used to initialize each location in the secret key array. This is done by replicating the user seed to fill all the locations in the secret key array.

The second step of the initialization process consists of filling the cipher arrays with data elements whose values are unique. The simplest way to achieve this objective is to fill each cipher array with data that range from zero to 'c−1', where 'c' is the dimension of the cipher arrays.

The concepts are better illustrated in the following example. In this regard, let the width of the confusion data in bits be 'm'=24, and let the number of cipher arrays that are used in the design of the confusion data generator be 'n'=3. Hence, each cipher array must generate 8 bits of random data per iteration. Thus, the dimension of each cipher array is 'c'=8.

Let Array_1, Array_2 and Array_3 be the three cipher arrays that would be used in the design of the confusion data generator. Furthermore, let the secret key array be Key whose dimension is the same as the dimension of each of the cipher arrays and is equal to 'c'=8.

Figure 4:
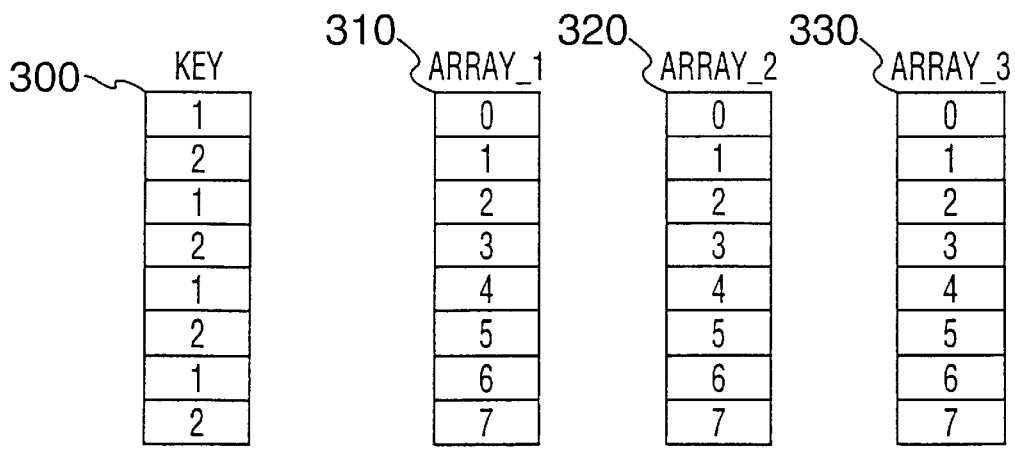
FIG. 4 is a block diagram of step 1 of the initialization sequence of the method applied by the processor of FIG. 3.

In FIG. 4, the details of initializing the secret key array and the cipher arrays are depicted. In step 300, the secret array Key is initialized with the user seed starting at location zero. The seed is replicated to fill all the locations in the array. In step 310 the cipher array Array_1 is filled with data elements starting at location zero. In step 320 and 330, the same process is repeated to cipher array Array_2 and Array_3.

Figure 5:
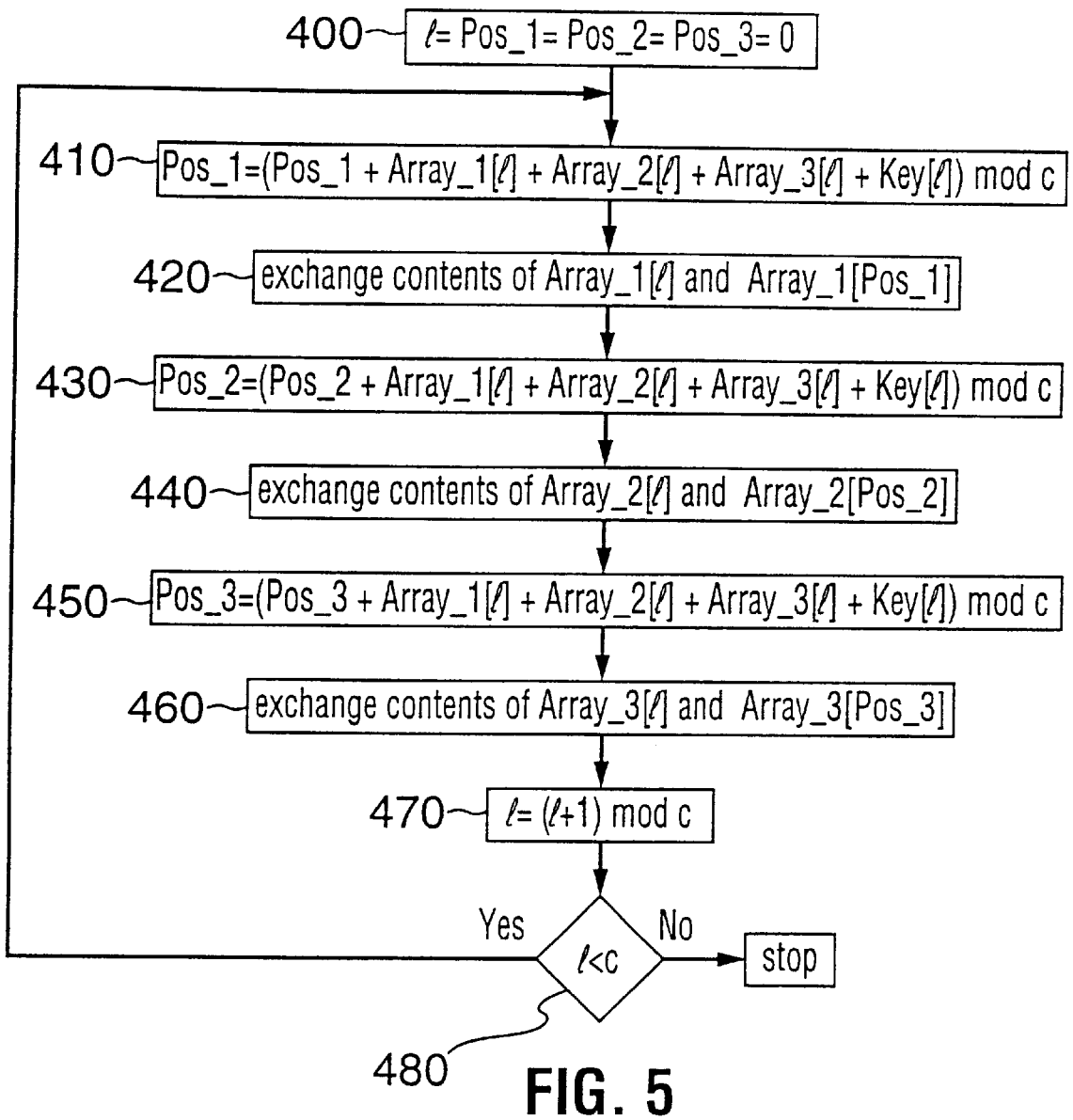
FIG. 5 is a block diagram of step 2 of the initialization sequence of the method applied by the processor of FIG. 3.

The third step in the initialization process consists of shuffling the contents of the cipher arrays as a function of the secret key array in a non-linear fashion. This step uses the mathematical modulo operation 'mod'. In FIG. 5, the details of the non-linear shuffling operation are depicted. Steps 470 and 480 ensure that all the elements of the cipher arrays are shuffled. In step 400, the variables '1', 'pos_1', 'pos_2' and 'pos_3' are initialized to zero. The variable '1' indicates the current location within the cipher array that must be shuffled. Variables 'pos_1', 'pos_2' and 'pos_3' are computed in a non-linear fashion and point to the location within a cipher array that must be exchanged with the '1'th location. In step 410, the new value of 'pos_1' is computed as a function 'Key[1]', 'Array_1[1]', 'Array_2[1]', 'Array_3[1]' and itself modulo 'c', where 'c' is the dimension of the cipher array. In step 420, the elements in location '1' and 'pos_1' in Array_1 are exchanged. The same processing is performed on the elements of Array_2 and Array_3 in steps 430, 440, 450 and 460.

The initialization process of FIG. 5 ensures that the contents of the cipher arrays are randomized in a non-linear fashion. The randomization process is a function of all the cipher arrays that are used in the design of the confusion data generator. Hence, although the same Key array is used in the randomization process, the technique of FIG. 5 ensures that the state of each cipher array is different after the completion of the initialization process. Therefore, this methodology results in the ability to generate a stream of cipher bits that is more secure for applications that use short size user seeds. Alternatively, multiple key arrays can be used in the randomization stage, whereby a different key array is associated with each cipher array.

Figure 6:
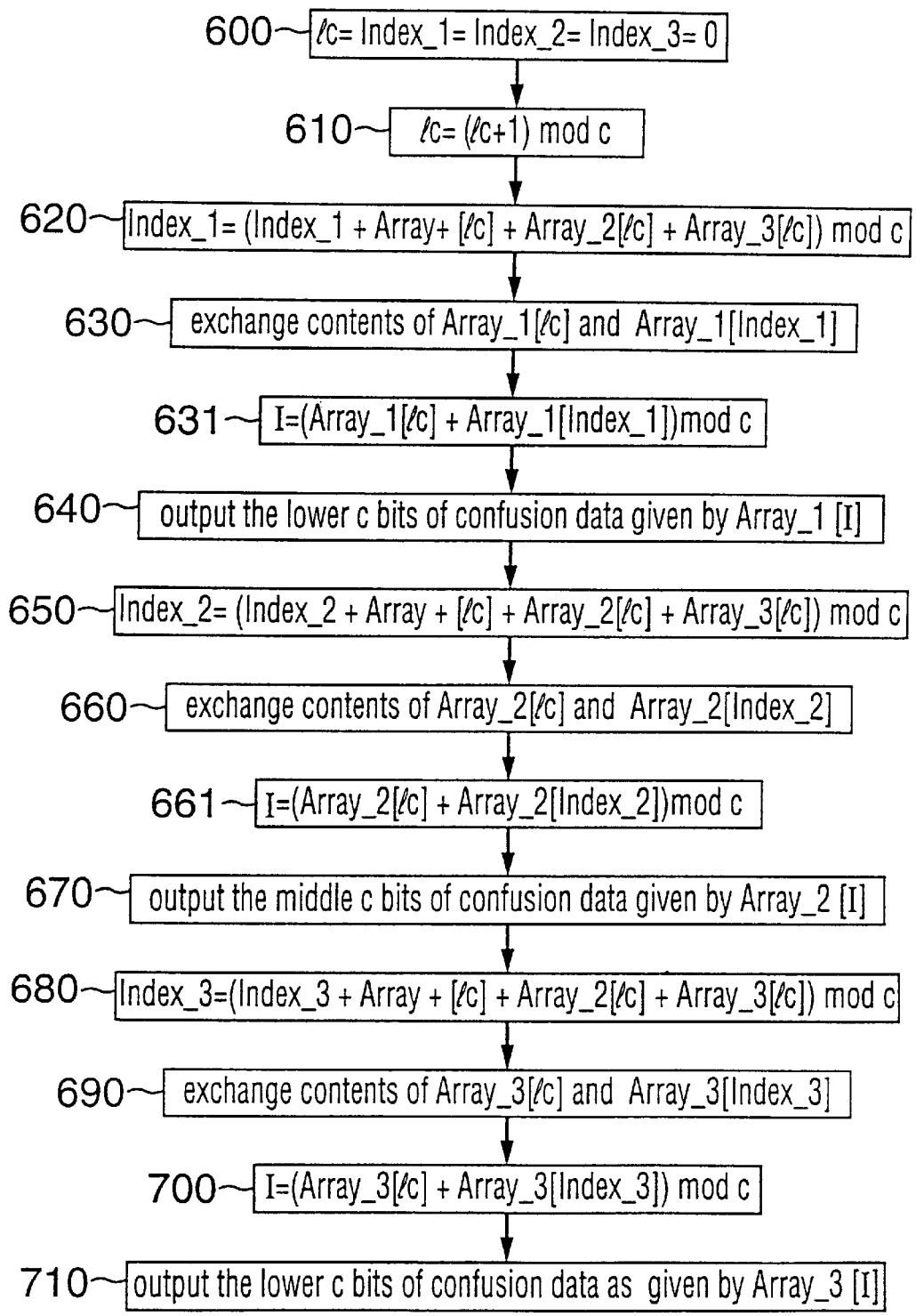
FIG. 6 is a block diagram of the confusion data generator of the method applied by the processor of FIG. 3.

In FIG. 6, the details of the actual generation of the confusion data are depicted. In step 600, the variables 'LC', 'Index_1', 'Index_2' and 'Index_3' are initialized to zero. Here, 'LC' acts as a data counter, it basically counts the number of data items that have been processed. The variables 'Index_1', 'Index_2' and 'Index_3' are used as indices to Array_1, Array_2 and Array_3, whereby the location that they point to is exchanged with location 'LC' in preparation for the next output sequence of the confusion data. In the example of FIG. 6, 'Index_1' is used to compute the lower 'c' bits of the confusion data. 'Index_2' is used to compute the middle 'c' bits of the confusion data and 'Index_3' is used to compute the upper 'c' bits of the confusion data. The order of the indices can vary from one application to another and is user specified. In step 610, 'LC' is incremented to indicate that one piece of data is processed. The process is performed as a modulo 'c' operation. In step 620, the new value of 'Index_1' is computed as a modulo 'c' operation consisting of the previous value of 'Index_1', the 'LC' position of Array_1, Array_2, and Array_3. In step 630, the 'LC' element and the 'Index_1' element of Array_1 are exchanged. In step 631, the index of the lower 'c' bits of the confusion data is computed and stored in the variable 'I'. Here 'I' is computed as a modulo 'c' operation of the addition of 'Array_1[Index_1]' and 'Array_1[LC]'. In step 640, the lower 'c' bits of confusion data are generated by outputting the Ith location of Array_1.

In step 650, the new value of 'Index_2' is computed as a modulo 'c' operation consisting of the previous value of 'Index_2', the 'LC' position of Array_1, Array_2 and Array_3. In step 660, the 'Index_2' elements and the 'LC' location of Array_2 are exchanged. In step 661, the index of the middle 'c' bits of the confusion data is computed and stored in the variable 'I'. Here 'I' is computed as a modulo 'c' operation of the addition of 'Array_2[Index_2]' and 'Array_2[LC]'. In step 670, the middle 'c' bits of confusion data are generated by outputting the Ith location of Array_2.

In step 680, the new value of Index_3 is computed as a modulo 'c' operation consisting of the previous value of 'Index_3', the 'LC' position of Array_1, Array_2 and Array_3. In step 690, the 'Index_3' elements and the 'LC' element of Array_3 are exchanged. In step 700, the index of the upper 'c' bits of the confusion data is computed and stored in the variable 'I'. Here 'I' is computed as a modulo 'c' operation of the addition of 'Array_3[Index_3]' and 'Array_3[LC]'. In step 710, the upper 'c' bits of the confusion data are generated by outputting the Ith location of Array_3.

The technique of FIG. 6 utilizes multiple cipher arrays to generate a block of cipher bits as a collection of smaller size sub-blocks. The technique requires that at least two sub-blocks be used to generate a cipher block. The cipher bits from a block can be used to secure at least a sub-block of text.

The technique of FIG. 6 presents a methodology for the non-linear generation of sub-blocks of cipher bits as a function of multiple cipher arrays acting as state machines. The methodology uses the cipher arrays in a feed forward and feed backward fashion to generate sub-blocks of cipher bits in a non-linear fashion. For each iteration the procedure of FIG. 6 computes an index to a cipher array as a function of the previous value of that index and the current location of all cipher arrays. The procedure then randomizes the cipher array by exchanging the contents of the two locations. The procedure then computes in a non-linear fashion the index of the next sub-block of cipher bits as a function of the two locations. Hence, per iteration all cipher arrays contribute to the randomization process.

In FIG. 6, the value of the location counter LC was incremented once per iteration. Alternatively, the value of LC could also be incremented after the generation of each sub-block of cipher bits or after any combination of sub-blocks.

The confusion data generator of this invention could be used to generate a m=n*w bits stream of cipher bits that could be used with an XOR combiner to encrypt 'm' bits of data. Furthermore, it could also be used in an effective way to minimize the limitation of the XOR combiner. In this regard, the confusion data generator could be used as a 'w' bit encryptor, whereby the lower, middle and upper 'w' bits are XORed together and the result is used to encrypt 'w' bits of data. Similarly, the confusion data generator could be used to encrypt 2*w' bits of data whereby, the lower and middle 'w' bits are XORed together and then used with the upper 'w' bits to encrypt the data. Any other combination could also be used. Such modifications give the designer the ability to hide the internal states of the confusion data generator from a cryptanalyst.

Figure 7:
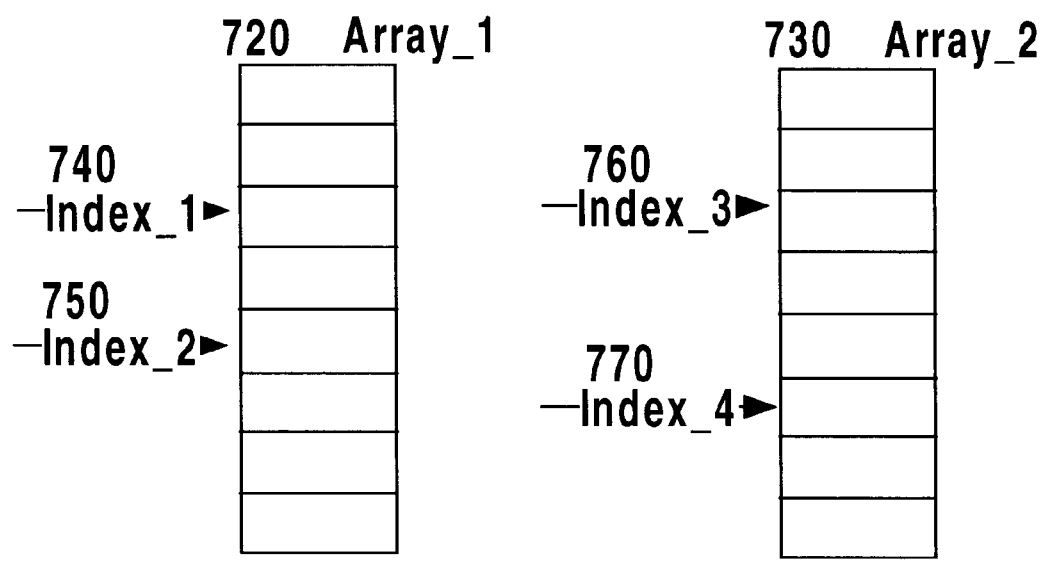

In FIG. 7 a further embodiment of the invention using two arrays 720, 730, each with two indices 740, 750 and 760, 770, is shown. This is embodiment is more fully described with reference to the FIG. 8.

Figure 8:
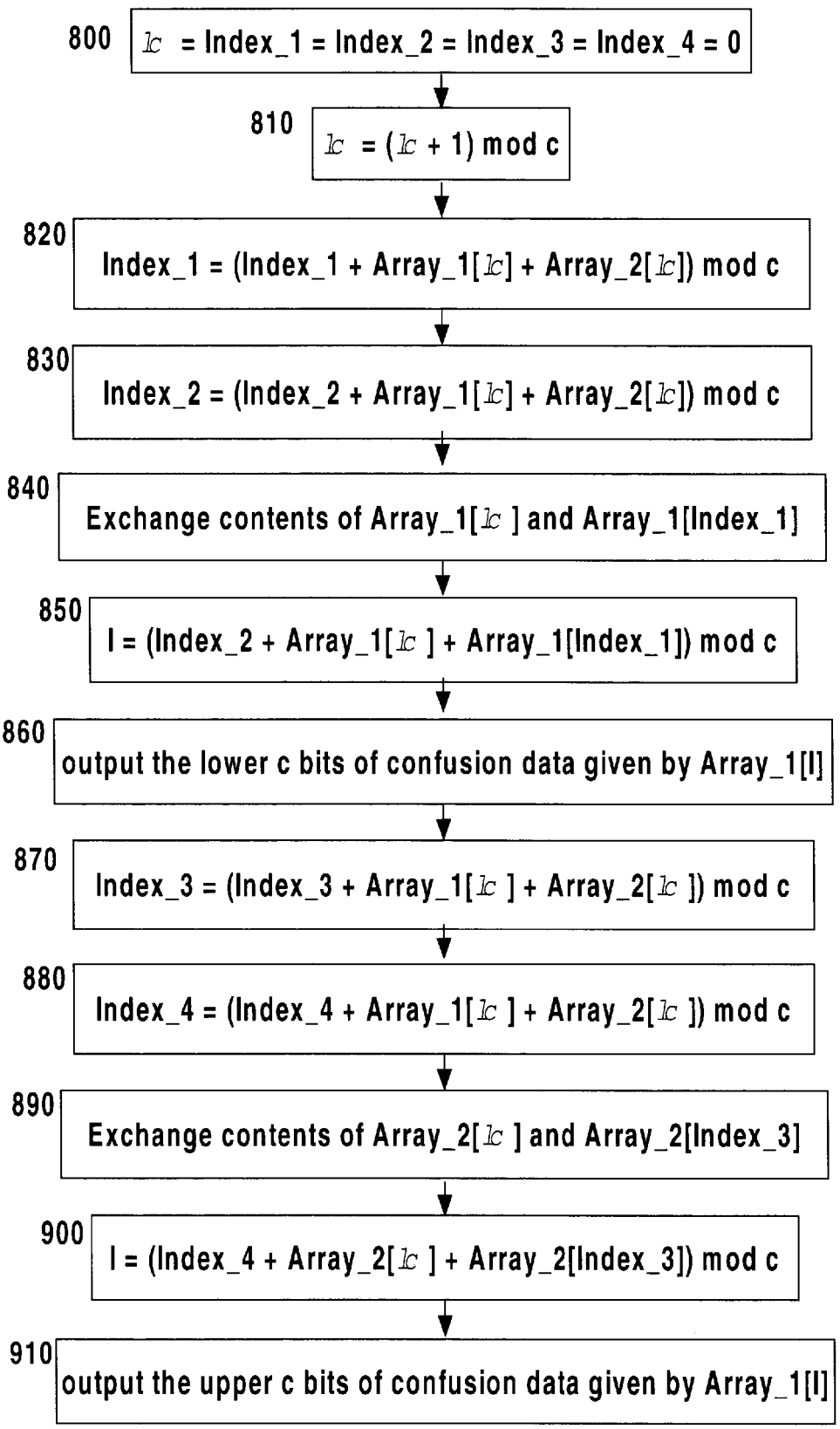

In FIG. 8, the details of the actual generation of the confusion data in this further embodiment of the invention are depicted. In this embodiment two indices are used into each array. In step 800, the variables 'LC', 'Index_1', 'Index_2', 'Index_3' and 'Index_4' are initialized to zero. As before, 'LC' acts as a data counter for the number of data items that have been processed. The variable 'Index_1' is used as an index to Array_1, and 'Index_3' is used as an index to Array_2, whereby the locations that they point to are exchanged with locations pointed to by 'LC' in preparation for the next output sequence of the confusion data. Index_2 is used as an index to Array_1, and 'Index_4' is used as an index to Array_2, to further confuse the method. In the example of FIG. 8, 'Index_1' and 'Index_2' are used to compute the lower 'c' bits of the confusion data. 'Index_3' and 'Index_4' are used to compute the upper 'c' bits of the confusion data. The order of the indices can vary from one application to another and is user specified. In step 810, 'LC' is incremented to indicate that one piece of data is processed. The process is performed as a modulo 'c' operation. In step 820, the new value of 'Index_1' is computed as a modulo 'c' operation consisting of addition of the previous value of 'Index_1', the 'LC' position of Array_1, and the LC position of Array_2. In step 830, the new value of 'Index_2' is computed as a modulo 'c' operation consisting of addition of the previous value of 'Index_2', the 'LC' position of Array_1, and the LC position of Array_2. In step 840, the 'LC' element and the 'Index_1' element of Array_1 are exchanged. In step 850, the index of the lower 'c' bits of the confusion data is computed and stored in the variable 'I'. Here 'I' is computed as a modulo 'c' operation of the addition of 'Index_2', Array_1[Index_1] and Array_1[LC]. In step 860, the lower 'c' bits of confusion data are generated by outputting the Ith location of Array_1.

In step 870, the new value of 'Index_3' is computed as a modulo 'c' operation consisting of the previous value of 'Index_3', the 'LC' position of Array_1, and the 'LC' position of Array_2. In step 880, the new value of 'Index_4' is computed as a modulo 'c' operation consisting of the previous value of 'Index_4', the 'LC' position of Array_1, and the 'LC' position of Array_2. In step 890, the 'Index_3' elements and the 'LC' element of Array_2 are exchanged. In step 900, the index of the upper 'c' bits of the confusion data is computed and stored in the variable 'I'. Here 'I' is computed as a modulo 'c' operation of the addition of Index_4, 'Array_2[Index_3]' and 'Array_2[LC]'. In step 900, the upper 'c' bits of confusion data are generated by outputting the Ith location of Array_1.

The technique of FIG. 8 utilizes multiple cipher arrays to generate a block of cipher bits as a collection of smaller size sub-blocks. The technique requires that at least two sub-blocks be used to generate a cipher block. The cipher bits from a block can be used to secure at least a sub-block of text.

The technique of FIG. 8 presents a methodology for the non-linear generation of sub-blocks of cipher bits as a function of multiple cipher arrays acting as state machines. The methodology uses the cipher arrays in a feed forward and feed backward fashion to generate sub-blocks of cipher bits in a non-linear fashion. For each iteration the procedure of FIG. 6 computes an index to a cipher array as a function of the previous value of that index and the current location of all cipher arrays. The procedure then randomizes the cipher array by exchanging the contents of the two locations. The procedure then computes in a non-linear fashion the index of the next sub-block of cipher bits as a function of the two locations. Hence, per iteration all cipher arrays contribute to the randomization process.

In FIG. 8 the value of the location counter LC was incremented once per iteration. Alternatively, the value of LC could also be incremented after the generation of each sub-block of cipher bits or after any combination of sub-blocks.

The confusion data generator of the present invention provides a mechanism for generating a confusion data stream that is highly non-linear or complex in nature. Advantages of the invention include the use of the non-linear or complex in nature. Advantages of the invention include the use of the non-linear mathematical modulo operation to combine the operation of the cipher arrays in a non-linear fashion. The invention has provided a novel mechanism for developing feed forward and feed backward state machines that are highly non-linear. The invention overcomes one of the basic limitations of the XOR combiner by developing a confusion data generator that generates a block of 'm' bits of confusion data per each iteration that can be used to generate a 'k'<'m' bit cipher stream that does not reveal the internal states of the confusion data generator. The invention results in the ability to design confusion data generators that are scalable, fast and secure.

Numerous modifications, variations and adaptations may be made to the particular embodiments of the invention described above without departing from the scope of the invention, which is defined in the claims.

I claim:

1. A confusion data generator comprising first and second state machines, the second state machine driving the first state machine using data feedback.

2. A confusion data generator as defined in claim 1, comprising first and second state machines, the first state machine driving the second state machine in a forward fashion, and the second state machine driving the first state machine using data feedback.

3. A confusion data generator as defined in claim 2, wherein the first state machine drives itself and the second state machine, and the second state machine drives itself and the first state machine.

4. A confusion data generator as defined in claim 1, wherein each state machine comprises an array and an index therefor.

5. A confusion data generator as defined in claim 4, wherein the location of each index in its array is dependent upon the location of another index in its array.

6. A confusion data generator as defined in claim 4, further comprising the use of the LC variable as a data counter.

7. A confusion data generator as defined in claim 1 wherein a further output of the second state machine and a data stream are combined using a combiner to produce a confused data stream.

8. A confusion data generator as defined in claim 7, wherein the combiner is an XOR combiner.

9. A confusion data generator comprising: a series of state machines including first and last state machines, each state machine driving the next state machine in the series in a forward fashion, and the last state machine driving the first state machine using data feedback.

10. A confusion data generator as claimed in claim 2, wherein each state machine drives itself and every other state machine.

11. A non-linear confusion data generator for generating blocks of confusion bits, the confusion data generator comprising:
- (a) a location counter having a value corresponding to the number of blocks of confusion bits generated;
- (b) a first array comprising a series of data elements, each of which has a value;
- (c) a first index having a value corresponding to a data element in the first array;
- (d) a second index having a value corresponding to a data element in the first array;
- (e) a second array comprising a series of data elements, each of which has a value;
- (f) a third index having a value corresponding to a data element in the second array;
- (g) a fourth index having a value corresponding to a data element in the second array;
- (h) means for incrementing the value of the location counter;
- (i) means for updating the value of the first index as a function of the value of the first index, the value of the data element of the first array corresponding to the value of the location counter, and the value of the data element of the second array corresponding to the value of the location counter;
- (j) means for updating the value of the second index as a function of the value of the data element in the first array corresponding to the value of the first index, and the value of the data element in the first array corresponding to the value of the location counter;
- (k) means for exchanging the value of the data element in the first array corresponding to the value of the first index and the value of the data element in the first array corresponding to the value of the location counter;
- (l) means for updating the value of the third index as a function of the value of the third index, the value of the data element of the first array corresponding to value of the location counter, and the value of the data element of the second array corresponding to the value of the location counter;
- (m) means for updating the value of the fourth index as a function of the value of the data element in the second array corresponding to the value of the third index, and the value of the data element in the second array corresponding to the value of the location counter;
- (n) means for exchanging the value of the data element in the second array corresponding to the value of the third index and the value of the data clement in the second array corresponding to the value of the location counter;
- (o) means for generating from the first array a first sub-block of confusion bits equal to the value of the data element in the first array corresponding to the value of the second index;
- (p) means for generating from the second array a second sub-block of confusion bits equal to the value of the data element in the second array corresponding to the value of the fourth index;
- (q) means for generating a block of confusion bits comprising the first and second sub-blocks of confusion bits; and
- (r) means for applying the block of confusion bits to a medium.

12. A non-linear confusion data generator for generating blocks of confusion bits, as defined in claim 11 the confusion data generator comprising:
- (a) a location counter having a value corresponding to the number of blocks of confusion bits generated;
- (b) a plurality of arrays, each array comprising:
    - (i) a series of data elements, each data element having a value;
    - (ii) a first index having a value corresponding to a data element in the array; and
    - (iii) a second index having a value corresponding to a data element in the array;
- (c) means for incrementing the value of the location counter;
- (d) means for updating the value of the first index in each array as a function of the value of the first index of such array, the value of the data element of such array corresponding to the value of the location counter, and the value of the data element of at least one other array corresponding to the value of the location counter;
- (e) means for updating the value of the second index in each array as a function of the value of the data element in such array corresponding to the value of the first index in such array, and the value of the data element in such array corresponding to the value of the location counter;
- (f) means for exchanging the value of the data element in each array corresponding to the value of the first index in such array and the value of the data element in such array corresponding to the value of the location counter;
- (g) means for generating from the each array a sub-block of confusion bits equal to the value of the data element in such array corresponding to the value of the second index in such array;
- (h) means for generating a block of confusion bits comprising the sub-blocks of confusion bits generated by the arrays; and (i) means for applying the block of confusion bits to a medium.

13. A method for generating blocks of confusion bits, the method utilizing a non-linear confusion data generator comprising: a location counter having a value corresponding to the number of blocks of confusion bits generated; a first array comprising a series of data elements, each of which has a value; a first index having a value corresponding to a data element in the first array; a second index having a value corresponding to a data element in the first array; a second array comprising a series of data elements, each of which has a value; a third index having a value corresponding to a data element in the second array; and a fourth index having a value corresponding to a data element in the second array; the method comprising:

(a) incrementing the value of the location counter;

(b) updating the value of the first index as a function of the value of the first index, the value of the data element of the first array corresponding to the value of the location counter, and the value of the data element of the second array corresponding to the value of the location counter;

(c) updating the value of the second index as a function of the value of the data element in the first array corresponding to the value of the first index, and the value of the data element in the first array corresponding to the value of the location counter;

(d) exchanging the value of the data element in the first array corresponding to the value of the first index and the value of the data element in the first array corresponding to the value of the location counter;

(e) updating the value of the third index as a function of the value of the third index, the value of the data element of the first array corresponding to value of the location counter, and the value of the data element of the second array corresponding to the value of the location counter;

(f) updating the value of the fourth index as a function of the value of the data element in the second array corresponding to the value of the third index, and the value of the data element in the second array corresponding to the value of the location counter;

(g) exchanging the value of the data element in the second array corresponding to the value of the third index and the value of the data element in the second array corresponding to the value of the location counter;

(h) the first array generating a first sub-block of confusion bits equal to the value of the data element in the first array corresponding to the value of the second index;

(i) the second array generating a second sub-block of confusion bits equal to the value of the data element in the second array corresponding to the value of the fourth index;

(j) generating a block of confusion bits comprising the first and second sub-blocks of confusion bits; and (k) applying the block of confusion bits to a medium.

14. A method for generating blocks of confusion bits, the method utilizing a non-linear confusion data generator comprising: a location counter having a value corresponding to the number of blocks of confusion bits generated; a plurality of arrays, each array comprising a series of data elements, each data element having a value a first index having a value corresponding to a data element in the array and a second index having a value corresponding to a data element in the array;

(a) incrementing the value of the location counter;

(b) updating the value of the first index in each array as a function of the value of the first index of such array, the value of the data element of such array corresponding to the value of the location counter, and the value of the data element of at least one other array corresponding to the value of the location counter;

(c) updating the value of the second index in each array as a function of the value of the data clement in such array corresponding to the value of the first index in such array, and the value of the data element in such array corresponding to the value of the location counter;

(d) exchanging the value of the data element in each array corresponding to the value of the first index in such array and the value of the data element in such array corresponding to the value of the location counter;

(e) generating from the each array a sub-block of confusion bits equal to the value of the data element in such array corresponding to the value of the second index in such array;

(f) generating a block of confusion bits comprising the sub-blocks of confusion bits generated by the arrays; and (g) applying the block of confusion bits to a medium.

15. A non-linear confusion data generator for generating blocks of confusion bits, the confusion data generator comprising:

(a) a location counter having a value corresponding to the number of blocks of confusion bits generated;

(b) a first array comprising a series of data elements, each of which has a value;

(c) a first index having a value corresponding to a data element in the first array;

(d) a second array comprising a series of data elements, each of which has a value;

(e) a second index having a value corresponding to a data element in the second array;

(f) a third array comprising a series of data elements, each of which has a value;

(g) a third index having a value corresponding to a data element in the second array;

(h) means for incrementing the value of the location counter;

(i) means for updating the value of the first index as a function of the value of the first index, the value of the data element of the first array corresponding to the value of the location counter, the value of the data element of the second array corresponding to the value of the location counter, and the value of the data element of the third array corresponding to the value of the location counter;

(j) means for exchanging the value of the data element of the first array corresponding to the value of the location counter and the value of the data element of the first array corresponding to the value of the first index;

(k) means for computing the value of a variable index as a function of the value of the data element of the first array corresponding to the location counter and the value of the data element of the first array corresponding to the first index;

(l) means for outputting as a first sub-block of confusion data bits the value of the data element of the first array corresponding to the value of the variable index;

(m) means for updating the value of the second index as a function of the value of the second index, the value of the data element of the first array corresponding to the value of the location counter, the value of the data element of the second array corresponding to the value of the location counter, and the value of the data element of the third array corresponding to the value of the location counter;

(n) means for exchanging the value of the data element of the second array corresponding to the value of the location counter and the value of the data element of the second array corresponding to the value of the second index;

(o) means for computing the value of the variable index as a function of the value of the data element of the second array corresponding to the location counter and the value of the data element of the second array corresponding to the first index;

(p) means for outputting as a second sub-block of confusion data bits the value of the data element of the second array corresponding to the value of the variable index;

(q) means for updating the value of the third index as a function of the value of the third index, the value of the data element of the first array corresponding to the value of the location counter, the value of the data element of the second array corresponding to the value of the location counter, and the value of the data element of the third array corresponding to the value of the location counter;

(r) means for exchanging the value of the data element of the third array corresponding to the value of the location counter and the value of the data element of the third array corresponding to the value of the third index;

(s) means for computing the value of the variable index as a function of the value of the data element of the third array corresponding to the location counter and the value of the data element of the third array corresponding to the first index;

(t) means for for outputting as a third sub-block of confusion data bits value of the data element of the third array corresponding to the value of the variable index;

(u) means for generating a block of confusion data comprising the first sub-block, the second sub-block and the third sub-block of confusion bits; and (v) means for applying the block of confusion bits to a medium.

* * * * *

UNITED STATES PATENT AND TRADEMARK OFFICE
CERTIFICATE OF CORRECTION

PATENT NO.    : 6,404,888 B1
DATED         : June 11, 2002
INVENTOR(S)   : Barbir, Abdulkader Omar It is certified that error appears in the above-identified patent and that said Letters Patent is hereby corrected as shown below:

Column 11,
Line 27, delete "claim 2" and insert -- claim 9 --;

Column 12,
Line 12, delete "clement" and insert -- element --;

Column 14,
Line 9, delete "clement" and insert -- element --;

Signed and Sealed this

Twenty-ninth Day of October, 2002

Attest:

Attesting Officer

JAMES E. ROGAN
Director of the United States Patent and Trademark Office